July 2, 1929.  G. DICKSON  1,719,599
CUTTING DEVICE
Filed Aug. 3, 1925   2 Sheets-Sheet 1
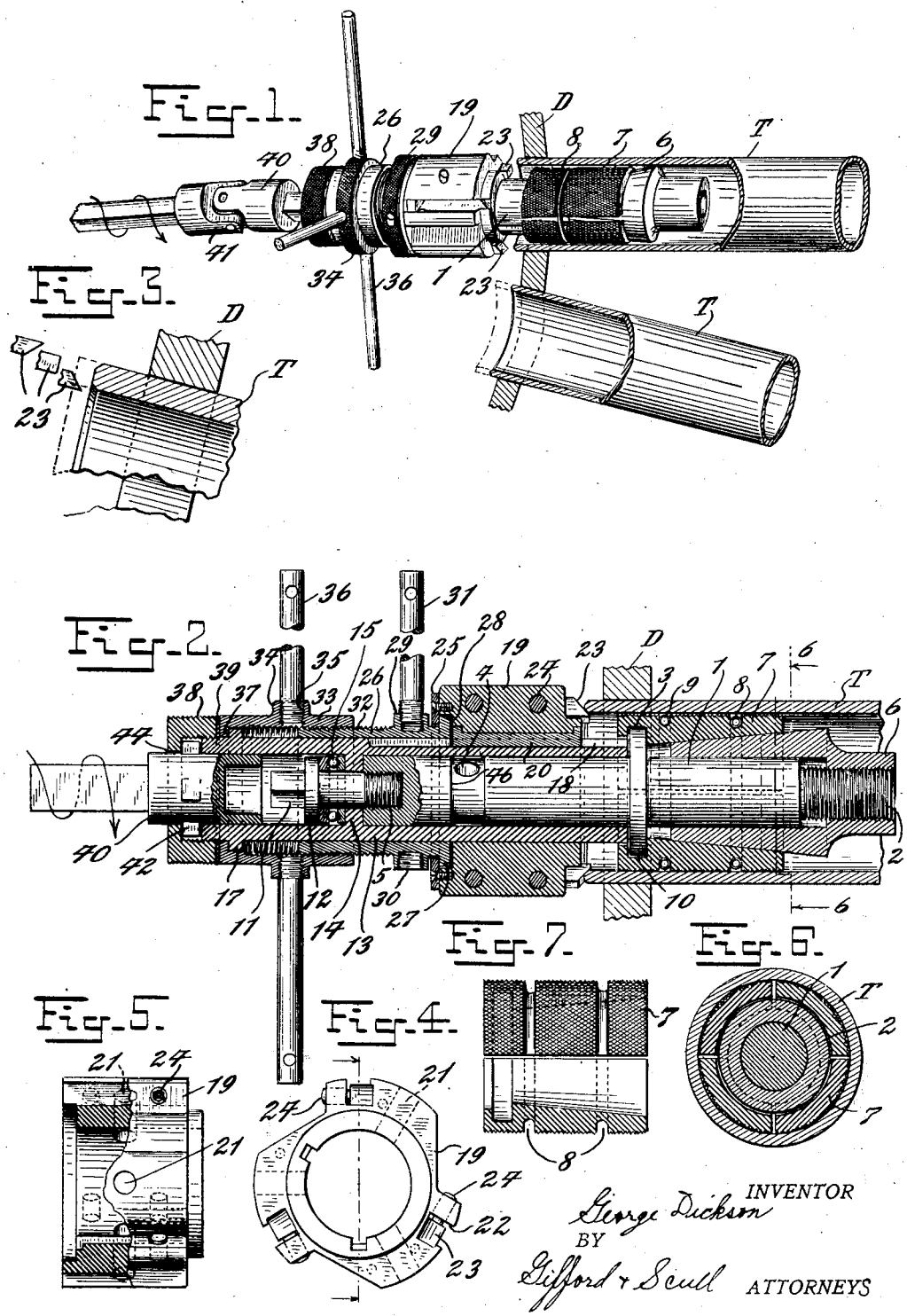
INVENTOR
George Dickson
BY
Gifford & Scull  ATTORNEYS July 2, 1929.  G. DICKSON  1,719,599
CUTTING DEVICE
Filed Aug. 3, 1925  2 Sheets-Sheet 2
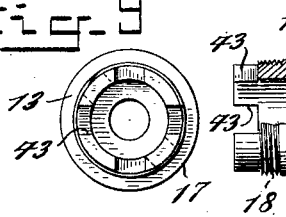 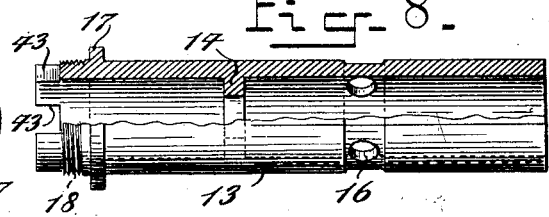 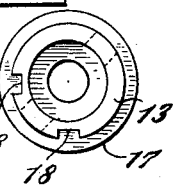
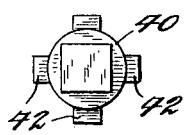 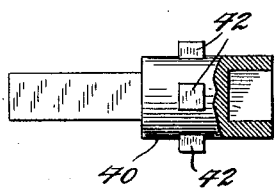  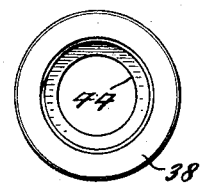
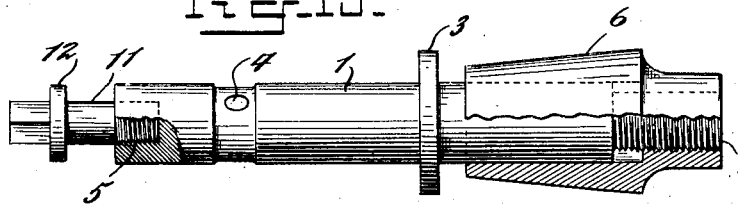 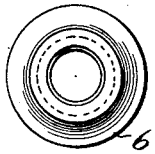
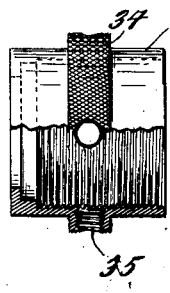 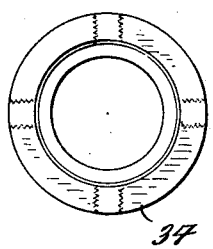 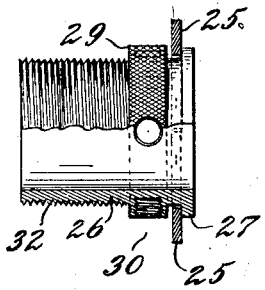 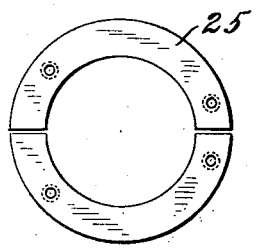
George Dickson INVENTOR
BY
Gifford & Scull ATTORNEYS Patented July 2, 1929.

1,719,599

UNITED STATES PATENT OFFICE.

GEORGE DICKSON, OF CHICAGO, ILLINOIS, ASSIGNOR TO THE BABCOCK & WILCOX COMPANY, OF BAYONNE, NEW JERSEY, A CORPORATION OF NEW JERSEY.

CUTTING DEVICE.

Application filed August 3, 1925. Serial No. 47,707.

This invention relates especially to a device for cutting the ends of tubes that are inserted in boiler heads, drums, etc., preparatory to their being expanded into place, although it is not restricted to this particular use. With this device, tubes which have been inserted into a drum head or the like can be chamfered on the inside and outside at the end thereof in one operation, so as to make the same suitable for being expanded into their seats. The tubes will preferably be treated before being inserted, so that their surfaces will be clean and smooth or free from corrosion or scale.

In manufacturing water tube boilers that are to carry high pressures, care should be exercised not to have any tube so short that insufficient material projects beyond the drum plate to provide for expansion into place. In order to prevent the tubes from being too short, the tubes are often made somewhat longer than necessary so as allow the removal of excess material, thus making the tubes of the proper length. By the present invention, a convenient portable cutting and chamfering tool is provided by which the work of cutting off the excess material at the ends of the tubes can be readily performed, and the ends of the tubes can be left in such shape that they can be readily expanded into their seats so as to be held securely therein.

The invention will be understood from the description in connection with the accompanying drawings, in which Fig. 1 is a perspective view showing the device as it operates on a tube; Fig. 2 is a longitudinal section through the device; Fig. 3 is an enlarged detail showing how the tubes are cut or chamfered; Fig. 4 is a side view, partly in section, of the cutter head; Fig. 5 is an end view of the same shown partly in section; Fig. 6 is a cross section through the device along the line 6—6 of Fig. 2; Fig. 7 shows a side view and section of the split sleeves of the expansible plug; Fig. 8 is a side view of the driving sleeve, partly in section; Figs. 9 and 10 are views from opposite ends of Fig. 8; Fig. 11 is a side view of the driving spindle; Fig. 12 is an end view of the same; Fig. 13 is an elevation of a retaining nut shown partly in section; Fig. 14 is a side view of the same; Fig. 15 is a side view of the shaft; Fig. 16 is an end view of the expanding nut; Fig. 17 is a side view of a feed nut, partly broken away; Fig. 18 is an end view of the same; Fig. 19 is a side view partly in section showing the feed sleeve and Fig. 20 is a side view of a split ring.

In the drawings, reference character T (Fig. 1) indicates tubes of a boiler or the like, in one of which the device is secured. The upper tube T in Fig. 1 shows the cutter ready to cut and chamfer the end of the tube, and the lower tube T shows a tube that was so long that it was inserted through the wall D of the drum farther than was necessary, the excess part having been cut way, as shown by the dotted lines.

The cutter comprises a shaft 1 (Fig. 2) having a reduced end which is screw-threaded, as shown at 2. The shaft 1 is provided with a flange 3 intermediate to its ends and has a hole 4 through it. The end of the shaft 1 opposite the threaded portion 2 is provided with a threaded hole 5 for stud bolt 11. The shaft 1 carries a hollow internally-threaded nut 6 with a conically-shaped external portion on the threaded end 2 of shaft 1. An expansible plug 7 is made of a plurality of sections assembled to form an expansible plug, and it is so shaped that its inner surface fits the conical surface of the nut 6. The expansible plug 7 is provided with one or more annular grooves 8 in which band or bands 9, preferably of coiled wire springs, are placed to hold the several sections in assembled relation around the nut 6. The sections of the expansible plug 7 are provided internally near one end thereof with an annular groove 10, into which the flange 3 on shaft 1 projects, and the outside surface of the sections are roughened to provide gripping surfaces.

A short stud bolt 11 is screw-threaded to fit tight into the threaded hole 5 in the end of the shaft 1, and this stud bolt 11 is provided with a collar or thrust bearing 12. A driving sleeve 13 (Figs. 2 and 8) is journaled on this stationary shaft 1 and is provided with an internal ring 14 which projects into the space between the end of the shaft 1 and the collar or thrust bearing 12 on the stud bolt 11. A ball bearing 15 is preferably interposed between the ring 12 and ring 14. One or more holes 16 in sleeve 13 are provided, which may be brought into register with the hole 4 in the shaft 1. An external ring 17 is provided near the end of the sleeve 13, and this sleeve is externally threaded at its end beyond the ring 17.

The sleeve 13 is provided with keyways 18 (Figs. 2 and 10) for the cutter head or milling cutter 19 to be mounted thereon. The cutter head 19 is keyed to the sleeve 13 by means of the key 20, so that it may slide longitudinally along this sleeve. Holes 21 (Figs. 4 and 5) extend through the cutter head 19 and may be brought into register with the holes 16 in sleeves 13 and the hole 4 in shaft 1. The cutter head 19 is provided with longitudinal recesses 22, in which cutters 23 may be fastened by means of screws 24. The ends of the cutters 23 may be of different shapes, as shown in Fig. 3, so that the inside and outside portions of the tube T may be chamfered, while the end thereof may be cut straight across. In this figure, some of the ends of the cutters 23 are shown as being farther advanced longitudinally than the others, merely for the sake of clearly showing their operation. A ring 25 (Figs. 2 and 20) made in segmental semi-circular parts, is attached by means of screws to the end of the cutter head 19 to interlock with a feed sleeve 26 by its flange 27 at the end thereof (Figs. 2 and 19). The flange 27 extends into the space between the ring 25 and an annular shoulder on the inside of cutter head 19. A washer 28 preferably of bronze is interposed between the flange 27 and the annular shoulder on the cutter head 19, in order to reduce friction and take up the wear. The feed sleeve 26 is provided with an external ring 29, in which there are a number of holes 30 for convenience in inserting a rod or rods 31 with which to hold or turn the feed sleeve. The externally-threaded portion 32 of the sleeve 26 is surrounded by an internally-threaded feed nut 33, which may be screwed on sleeve 26 or adjusted thereon to different positions, so that the feed sleeve 26 and feed nut 33 constitute, in effect, a longitudinally expansible sleeve. The feed nut 33 is provided with an external ring 34 in which there are holes 35, for convenience in inserting a rod or rods 36 for turning the feed nut. The feed nut 33 terminates in an internally-extending flange 37, which encompasses or surrounds a portion of the sleeve 13 beyond the ring 17.

An internally-threaded knurled cap 38 of cup shape screws on to the threaded end of the driving sleeve 13, and a washer 39 is interposed between the cap 38 and feed nut 33.

The driving spindle 40 which is connected by means of the universal joint 41 with any convenient motor or driving means is connected by means of the lugs 42 thereon with the driving sleeve 13, the lugs 42 fitting into recesses 43 at the end of the sleeve 13 in the manner of a clutch. The driving spindle 40 passes through a hole 44 in the cap 38 which is readily removable to disconnect or detach the coacting clutch members 42 and 43.

The device may be assembled as follows: The shaft 1 with the nut 6 and expansible plug 7 is inserted into a tube T, as shown in Figs. 1 and 2, and the shaft 1 is turned by inserting a rod or pin in the hole 4 thereof, while plug 7 and nut 6 are kept from turning by friction, thus drawing the nut 6 into the expansible plug 7 and causing the sections thereof to expand and grip the inside of tube T, thus firmly and rigidly securing the shaft in place in alinement with the tube T. During this operation, the ring 3 on the shaft 1 prevents the expansible plug 7 from being drawn forward. The cutter head 19 and the feed sleeve 26 are slipped over sleeve 13 with the cutter head 19 fitting over the key 20 in the keyway 18 and with the two halves of the ring 25 in place. The driving sleeve 13 may now be slipped over the end of the shaft until the ring 14 contacts with the end of the shaft 1, after which the ball bearing 15 is put in place and the stud bolt 11 screwed into the end of the shaft 1. The feed nut 33 is then slipped over the other end of the sleeve 13 and screwed into place. The driving spindle 40 is slipped into place with the lugs 42 in the recesses 43, after which the cap 38 is screwed on.

The operation is as follows: The driving spindle 40 is set in motion by the motor, thus revolving the sleeve 13 which carries the cutter head 19 and causes the ends of the various and dissimilar cutters 23 to cut the end of the tube T, the thrust being taken care of by the ring 12 on the stud bolt 11. When it is desired to advance the cutter head 19, either the feed sleeve 26 or the feed nut 33 is turned manually while the other is kept stationary, thus causing the cutter head 19 to be moved longitudinally so as to cut off more of the end of the tube T.

When it is desired to remove the device from the tube, the load on the cutters is released by a reverse movement of the feed mechanism A and rod or pin is inserted through a hole 21 in the cutter head 19, a hole 16 in the sleeve 13 and into a hole 4 in the shaft 1, which are brought into register with each other. The shaft 1 is then turned contrary to the cutting movement so as to cause the nut 6 to move longitudinally farther into the tube, thus permitting the expansible plug 7 to collapse and permit removal of the device from the tube T.

I claim:

1. In a milling tool, a solid shaft, expansion means at one end of said shaft to secure it within a tube, a sleeve mounted for rotation on the opposite end of the shaft and a milling cutter carried on said sleeve and keyed thereto for rotation therewith and for movement longitudinally thereof.

2. In a milling tool, a solid shaft, expansion means at one end of said shaft to secure it within a tube, a sleeve mounted for rotation on the opposite end of the shaft and a milling cutter carried on said sleeve and keyed thereto for rotation therewith, said milling cutter having various dissimilar cutters positioned at its end to give a desired outline to the end of the tube.

3. In a milling tool, a solid shaft, expansion means at one end of said shaft to secure it within a tube, a sleeve mounted for rotation thereon and extending from the opposite end of the shaft and a milling cutter mounted for rotation with said sleeve and for movement longitudinally thereof.

4. In a milling tool, a solid shaft, expansion means at one end of said shaft to secure it within a tube, a sleeve mounted for rotation thereon and extending from the opposite end of the shaft and a milling cutter slidably mounted for rotation with said sleeve, and detachable clutching means at said outer end for rotating said sleeve from a driven spindle.

5. In a milling tool, a shaft, expansion means at one end thereof to secure said shaft within a tube, a sleeve mounted for rotation thereon and fixedly positioned longitudinally thereof, a milling cutter slidably mounted on a key longitudinally positioned on said sleeve and means for feeding the milling cutter along said sleeve consisting of a nut and a sleeve threaded in a telescoping manner with each other.

6. In a milling tool, a shaft, means at one end thereof to secure it within a tube, a sleeve mounted for rotation on said shaft and extending from the opposite end thereof, an internal ring, a ball bearing cooperating with said ring to prevent longitudinal movement of said sleeve, a milling cutter slidably positioned on said sleeve and means for driving said sleeve.

7. In a milling tool, a solid shaft, means at one end thereof to secure it within a tube, a sleeve mounted for rotation thereon, friction reducing means retaining said sleeve against longitudinal movement relative to said shaft, a milling cutter slidably mounted for rotation with said sleeve, adjustable means on said sleeve for varying the operating load on the milling cutter and detachable driving means for said sleeve and cutter.

8. In a milling cutter for trimming the end of a tube, a shaft, a sleeve on said shaft, a cutting member keyed to said sleeve, and means to feed said member longitudinally on the sleeve.

9. In a cutter, a shaft, a conical nut into which said shaft is threaded, an expansible plug surrounding said nut, a cutting member rotatable around said shaft, and means to feed said member longitudinally.

10. In a cutter, a shaft, a sleeve on said shaft, a cutting member keyed to said sleeve, a cap attached to said sleeve, and an expansible feed device between said cap and member.

11. In a cutter, a shaft, a sleeve on said shaft, a cutting member keyed to said sleeve, a cap attached to said sleeve, and an expansible feed device comprising a nut in threaded engagement with a sleeve between said cap and member.

12. In a milling tool for cutting tube ends a solid shaft, means to hold said shaft within the tube, a sleeve rotatable on said shaft, a milling cutter on said sleeve and driven thereby, holes through the milling cutter and sleeve and a hole in said shaft, which holes may be brought into registry so that a pin may be inserted through the milling cutter, and sleeve, and into the shaft to move these parts of the milling tool in unison.

13. In a cutting tool to cut the end of a tube, a shaft, a shaft support adapted to be expanded against the interior of the tube to hold the shaft in axial alinement with the tube, a cutting device carried by said shaft and arranged with cutters to act on the end of the tube, and means to feed the cutting device into and out of cutting position.

14. In a cutting tool to cut the end of a tube, a shaft, a shaft support adapted to be expanded against the interior of the tube to hold the shaft in axial alinement with the tube, a cutting device rotatable on said shaft and arranged with cutters to act on the edge of the tube, and means to feed the cutting device into and out of cutting position.

15. In a cutting tool to cut the end of a tube, a shaft, a shaft support comprising a plurality of expansion members, means operable by the rotation of the shaft to press said expansion members against the interior of the tube to hold the shaft in axial alinement with the tube, a cutting device rotatable on said shaft and arranged with cutters to act on the edge of the tube, and means to feed the cutting device into and out of cutting position.

16. In a cutting tool to cut the end of a tube, a shaft, a shaft support adapted to be expanded against the interior of the tube to hold the shaft in axial alinement with the tube, a cutting device rotatable on said shaft and arranged with cutters to act on the edge of the tube, means to feed the cutting device into and out of cutting position and a detachable clutching device for rotating said rotatable cutting device.

17. In a milling tool, a solid shaft, a reduced threaded end on said shaft, a conical nut on said threaded end, a split expansion block on said nut and retained by a flange on said shaft against displacement therealong, a sleeve rotatably mounted on said shaft and extending beyond the end thereof opposite said reduced end, an internal ring on said sleeve and engaging said opposite end, a bolt threaded into said shaft, opposite said reduced end, a ball bearing unit between the head of said bolt and said ring for receiving the longitudinal thrust of said sleeve, a milling cutter secured by a relatively long key to said sleeve for sliding movement thereon, a cap closing the end of said sleeve, a perforation in said cap furnishing a bearing for a spindle of a universal shaft, said cap retaining a detachable clutch means through which said universal shaft drives said sleeve, an internally threaded nut and an externally threaded sleeve co-operating with each other between the end cap and the milling cutter to furnish a slow motion feed to said milling cutter and means for operating said feed.

GEORGE DICKSON.